July 14, 1970 J. McCRADY 3,520,459

TAPE ADVANCE SYSTEM

Filed Sept. 29, 1967 2 Sheets-Sheet 1

JOHN McCRADY
INVENTOR

BY [signature]
ATTORNEY

TAPE ADVANCE SYSTEM

Filed Sept. 29, 1967 2 Sheets-Sheet 2

United States Patent Office 3,520,459

Patented July 14, 1970

3,520,459

TAPE ADVANCE SYSTEM

John McCrady, Dallas, Tex., assignor to Texas Instruments Incorporated, Dallas, Tex., a corporation of Delaware Filed Sept. 29, 1967, Ser. No. 671,804
Int. Cl. B65h *17/36*
U.S. Cl. 226—160 12 Claims

ABSTRACT OF THE DISCLOSURE

A tape advance system for advancing a printing tape in a stepwise fashion past the printhead of a printing system. The tape is gripped in a mechanism which moves a predetermined distance, advancing the tape, in response to a spring force. The tape is released from the mechanism when the mechanism is moved along the tape to a new gripping position in response to a magnetic field.

The present invention relates to printing systems for electronic calculators and more particularly to tape advance systems used to advance the printing tape past the printhead.

An object of the present invention is to provide a high speed tape advance system of minimum size and high reliability.

Another object of the present invention is to eliminate unwanted friction between the tape gripping mechanism and the tape.

Other objects, features and advantages of the invention may be best understood by reference to the following detailed description taken in conjunction with the accompanying drawings in which like reference numerals indicate like parts and in which.

Figure 1:
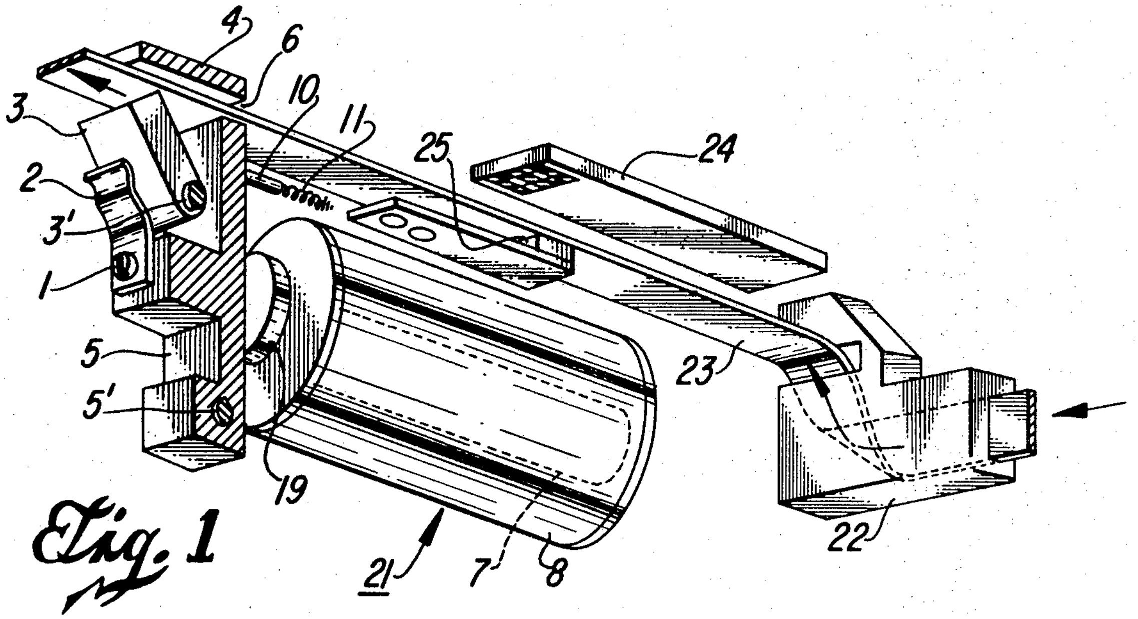
FIG. 1 illustrates a printing system according to an embodiment of the present invention.

Referring to FIG. 1, the printing system shown is a thermal print system suitable for use in a miniature calculator. The print tape 23 is a thermal sensitive tape which reacts to heat by changing color. An example of such a tape is that marketed under the name Thermo-Fax by the Minnesota Mining and Manufacturing Company. The tape is threaded through tape guide 22 and is positioned for printing between the printhead 24 and a resilient pressure pad 25. The printhead is a matrix of heating elements which are selectively heated to form the print character desired. The heat from the elements reacts with the thermal sensitive tape to print the character on the tape. After the character is printed on the tape, the tape advance system 21 according to the present invention advances the tape into position for the printing of the next character. To advance the tape, the system 21 employs a magnetic field which is actuated by an electric signal. In response to the magnetic field, a gripping mechanism moves a fixed distance from a rest position along the tape toward the printhead and then grips the tape at that point. During this movement, hereafter referred to as the "ready" stroke, the gripping mechanism exerts little or no friction force on the tape. When the magnetic field is terminated, a spring force drives the gripping mechanism away from the printhead back to the rest position. This movement is hereafter referred to as the "advance" stroke. The tape, being fixed in the gripping mechanism, is thus advanced past the printhead in a step-wise fashion. In the embodiment of FIG. 1, the magnetic field is produced by an electromagnetic coil 8 and a pole piece 7. The gripping mechanism is a pivoting clutch 3 and a clutch plate 4 and the spring force is provided by a drive spring 11. The movement of the gripping mechanism is accomplished by mounting it on a pivoting clapper 5 comprised of ferromagnetic material which pivots in a fixed arc in response to the magnetic field and spring force when the magnetic field is created and terminated.

Figure 2:
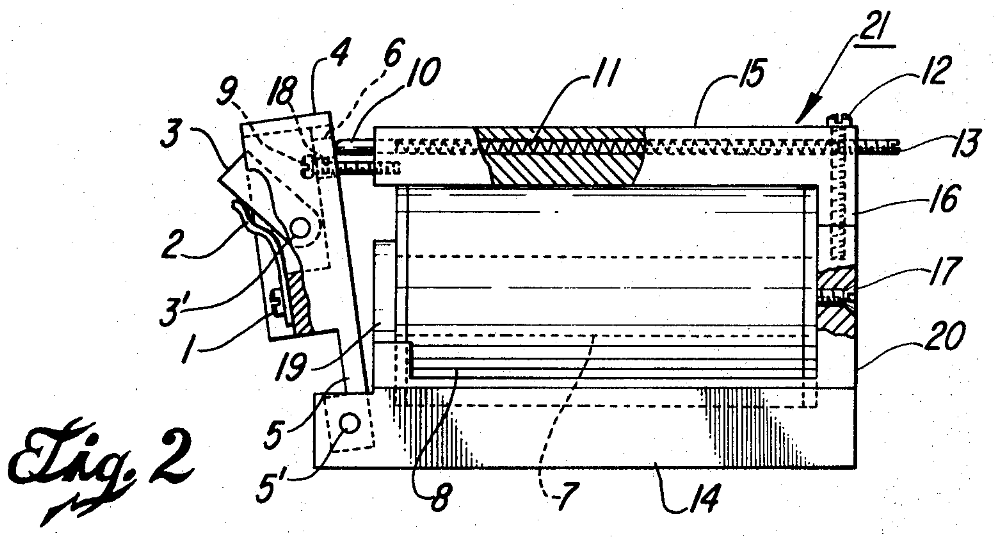
FIG. 2 illustrates the mounting of one embodiment of the present invention.

Referring now to FIG. 2, the parts of the tape advance system illustrated in FIG. 1 are shown mounted in a support frame. The support frame comprises two L shaped members, a lower frame member 14 and an upper frame member 15. The upper and lower frame members 14 and 15 are joined at their ends 16 and 20 by means of a screw 12 which passes through the end 16 into the end 20. The longer sections of the two frame members 15 and 14 are then parallel to each other and their inner surfaces are shaped so as to make a close fit with the body of the magnetic coil 8 which rests within the support frame.

The pole piece 7 is secured within a central opening in the coil 8 and has one end fixed to the lower frame member 14 by screw 17 and its other end fixed to end section 19. End section 19 is of a larger diameter than the central opening in the coil 8 and in conjunction with pole piece 7 and screw 17 fixes the magnetic coil 8 within the support frame. The end section 19 also serves as a flat surface against which the clapper 5 is forced upon actuation of the coil 8.

The clapper 5 is pivotally connected to the lower frame 14 by pin 5'. The clapper body has an aperture 6 through which the tape 23 passes. The aperture 6 is so positioned that when the clapper 5 is in the actuated (vertical) position, the top of the aperture is slightly above the top surface of the upper frame member 15. The top of the aperture is formed by the clutch plate 4. The clutch 3 is pivotally connected to the clapper body by pin 3' and is of sufficient length that one edge of its free end can contact the tape 23 and press it against the clutch plate 4.

The clutch spring 2 is attached to the clapper 5 by the screw 1 and biases the clutch 3. It aids in initiating and maintaining firm contact between the clutch 3, the tape 23 and the clutch plate 4 during the tape advance stroke.

A stroke length adjustment screw 9 passes through a hole 18 in the clapper 5 and is then threaded into the upper frame member 15. The hole 18 is wide enough to pass the screw body but not its head. The position of the head then serves as a means to control the amount of travel of the clapper 5 away from the vertical position.

A hole runs lengthwise through the upper frame member 15 and is threaded near the end 16. The drive spring 11 and an adjustment screw 13 are fitted into the hole with the screw 13 being at the threaded end. A striker end 10 is positioned against the free end of the spring 11 and extends out from the hole at the free end of the upper frame member 15 to contact the clapper 5.

Figure 3:
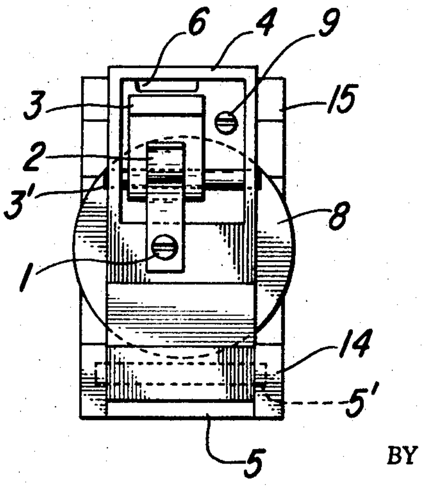
FIG. 3 illustrates a end view of the embodiment of FIG. 2.

FIG. 3 illustrates the left end view of FIG. 2 in order to illustrate more clearly the mounting of the clapper 5 and the clutch 3. The clapper 5 is pivotally mounted in a recessed portion of the lower frame 14 on pin 5'. The ends of the pin 5' are fixed in the lower frame 14. The clutch 3 is mounted in a recessed portion of the clapper 5 on pin 3'. The ends of the pin 3' are fixed in the side walls of the recessed portion. The clutch spring 2 is fixed by a screw 1 to the clapper 5 and is centered on the clutch 3. The clutch plate 4 forms the top of the recessed portion of the clapper 5. The clutch 3 is shown in the figure in the position it would be in during the "ready" stroke. The tape, which would be gripped between the clutch 3 and the clutch plate 4, is not shown and the aperture 6 through which it passes may be seen above the free end of the clutch 3.

Figure 4:
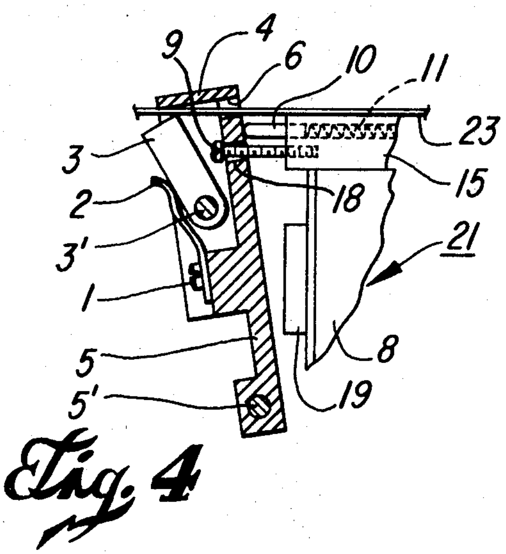
FIGS. 4–7 show various stages in the operation of the embodiment of FIG. 2.
Figure 5:
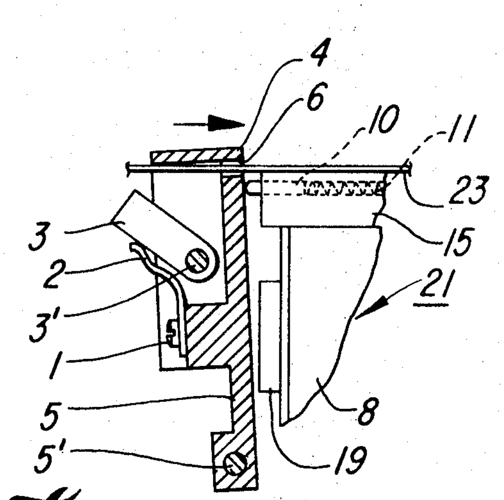

Referring now to FIGS. 4–7, various stages in the operation of the embodiment shown in FIG. 2 are illustrated. In FIG. 4 the system is in the unactuated state. An electric current is then applied to the coil 8, setting up a magnetic field. The clapper 5 being of opposite polarity to the pole piece 7 is attracted toward it. As the clapper 5 moves rapidly toward the pole piece 7, the center of gravity of the clutch 3 lags behind the movement of the clapper 5 due to the rest inertia of the clutch 3. The clutch 3 is pivoted away from the tape 23 and clutch plate 4 and is forced against the clutch spring 2, allowing the clapper 5 to move without affecting the position of the tape 23 (see FIG. 5). As the clapper 5 moves toward the pole piece 7 the drive sprnig 11, which is in contact with the clapper through the striker end 10, is compressed.

Figure 6:
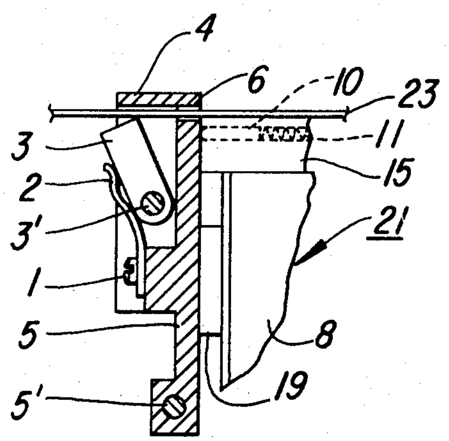

Referring to FIG. 6, when the clapper 5 contacts the pole piece end section 19, the clutch spring 2 and the momentum of the clutch 3 force the clutch to close against the tape 23, pressing it against the clutch plate 4. The clutch 3 is sufficiently long that only one edge thereof contacts the tape 23 and presses it against the clutch plate 4. This insures that after the tape is advanced there will be a minimum frictional force holding the clutch 3 against the tape 23, and the clutch 3 will be free to pivot away from the tape 23 when a new ready stroke begins.

Figure 7:
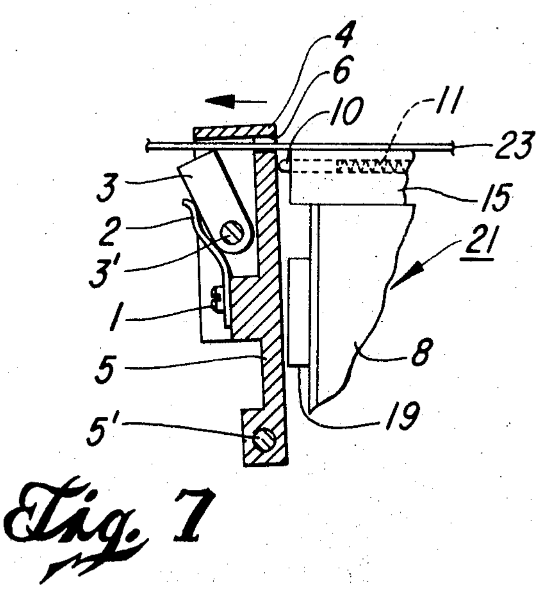

Once the clapper 5 is closed and the clutch 3 is in firm contact with the tape 23, the electric current is turned off terminating the magnetic field. As shown in FIG. 7, with the termination of the restraining magnetic force, the drive spring 11 expands, driving the clapper 5 away from the pole piece 7. The tape 23, gripped between the clutch 3 and the clutch plate 4, is advanced with the clapper 5. When the clapper strikes the head of the stroke adjustment screw 9 it stops. The system has returned to the unactuated position of FIG. 4 and the tape is now in position for new printing.

For different printing requirements it may be desirable to vary the length of the tape advancement or the drive spring force. The stroke length adjustment screw 9 may be easily set to give the desired advancement stroke and the adjustment screw 13 may be easily set to give the desired drive spring force.

The choice of construction materials aids in achieving the high operation speed of the tape advance system. The magnetic field should form as quickly as possible in response to the electric current and dissipate as quickly as possible when the current is stopped. For this reason the lower frame member 14 and pole piece 7 are constructed of a material having low resistance to magnetic flux and low residual magnetism such as #5 relay steel. The upper frame member 15 should not develop any appreciable magnetic polarity in response to the magnetic field. Any pole produced would be of the same polarity as the clapper 5 polarity and would oppose the closing of the clapper. The upper frame member 15 is thus constructed of a relatively non-magnetic material such as aluminum. The clutch 3 may also be constructed of non-ferromagnetic material so that the magnetic field will not affect its opening and closing.

The shape and volume of the copper windings of the coil 8 are designed to be of minimum size and weight and yet give the desired magnetic field. The support frame and clapper are designed to minimize parasitic air gaps so as to obtain maximum effect from the generated magnetic field.

The coil 8, pole piece 7 and support frame are also designed so as to give a magnetic field which is matched to the mechanical impedance presented by the pivoting clapper 5 when it is closed against the force of spring 11. This is to provide the greatest magnetic force at the points where the clapper 5 and drive spring 11 present the greatest resistance to closing. Matching the field and the mechanical impedance allows for a minimum required strength of the field and thus a minimum size coil.

At high speed operation it is difficult to release a gripping mechanism and move it to a new gripping point without some unwanted frictional force being applied to the tape during the ready stroke. The pivoting clutch 3 according to the present invention solves this problem. The clutch 3 opens against the clutch spring 2 automatically and immediately when the clapper 5 is activated by the magnetic field, and exerts no frictional force on the tape during the movement to a new gripping position. When the clapper 5 abruptly stops against the pole piece end section 19, the clutch spring 2 and clutch momentum immediately force the clutch 3 closed and the tape advance stroke can begin. The tape advance system consequently eliminates friction between the gripping mechanism and the tape during the ready strike and can operate as fast as the clapper 5 can be pivoted by the magnetic field and the drive spring 11. The elimination of the friction between the gripping mechanism and the tape is especially important in systems using tapes which can be made to move in either direction past the printhead or which are very flexible. Any friction on such tapes must be compensated for or it will tend to cause incorrect advancement of the tape by forcing it back toward the printhead or causing it to buckle. By eliminating the friction, the present invention eliminates the need for friction compensating means and avoids the extra size and complexity such means add to a tape advance system.

It is to be understood that the above-described embodiments are merely illustrative of the invention. Numerous other arrangements may be devised by those skilled in the art without departing from the spirit and scope of the invention.

What is claimed is:

1. A tape advance system comprising a support, electromagnetic means mounted on said support for creating a magnetic field in response to an electrical signal, first means mounted on said support for moving between first and second positions in response to the creation and termination of said magnetic field, said first means having an aperture therein said tape being positioned in said aperture, second means pivotally mounted on said first means for pressing said tape against said first means when said first means is at said first position and releasing said tape when said first means is at said second position whereby said tape is advanced during the movement of said first means from said first position to said second position and said tape is released during the movement of said first means from said second position to said first position.

2. The tape advance system defined in claim 1 wherein said second means is comprised of a non-ferromagnetic material.

3. The tape advance system of claim 1 wherein said first means includes a spring portion contacting said second means and forcing said second means toward said first means.

4. The tape advance system defined in claim 1 wherein said support is comprised of first and second members, said first means being mounted on said first member, said first member being comprised of ferromagnetic material having low resistance to magnetic flux and low residual magnetism and said second member being comprised of non-ferromagnetic material.

5. In a thermal printing system including a heat sensitive tape which changes color in response to heat and a thermal printhead for printing characters upon said heat sensitive tape, a tape advance system comprising: a support, electromagnetic means mounted on said support for creating a magnetic field in response to an electrical signal, first means mounted on said support for moving between first and second positions in response to the creation and termination of said magnetic field, said first means having an aperture therein, said tape being positioned in said aperture, second means pivotally mounted on said first means for pressing said tape against said first means when said first means is at said first position and releasing said tape when said first means is at said second position whereby said tape is advanced during the movement of said first means from said first position to said second position and said tape is released during the movement of said first means from said second position to said first position.

6. A tape advance system comprising: a support comprising ferromagnetic material, electromagnetic means mounted on said support for creating a magnetic field in response to an electrical signal, a first member comprising ferromagnetic material pivotally mounted on said support such that in response to said magnetic field said first member pivots toward said electromagnetic means, a first biasing means for forcing said first member away from said electromagnetic means when said magnetic field is terminated, a second member affixed to said first member, a third member pivotally connected to said first member, said first and second members defining an opening, said tape being positioned in said opening, second biasing means for forcing said third member toward said second member, said third member pressing said tape against said second member while said first member is forced away from said electromagnetic means by said first biasing means and said third member being out of contact with said tape while said first member is pivoting in response to said magnetic field.

7. The tape advance system defined in claim 6 wherein said second member is an integral part of said first member and said second member comprises a flat surface parallel to the plane of said tape under which surface said tape is positioned.

8. The tape advance system defined in claim 6 wherein said second biasing means comprises a spring affixed to said first member and contacting said third member.

9. The tape advance system defined in claim 6 wherein said third member is comprised of a non-ferromagnetic material.

10. The tape advance system defined in claim 6 wherein said support is comprised of first and second parts, said first member being pivotally affixed to said first part, said first part being comprised of ferromagnetic material having low resistance to magnetic flux and low residual magnetism and said second part being comprised of non-ferromagnetic material.

11. The tape advance system defined in claim 6 wherein said second and third members are so disposed upon said first member that the distance between the surface of said second member against which said tape is pressed and the pivot point of said third member is less than the distance between said pivot point and the point of said third member which contacts said tape when said first member is forced away from said electromagnetic means.

12. A tape advance system comprising in combination:

(a) support means;

(b) tape means;

(c) electromagnetic means mounted on said support for creating a magnetic field in response to an electrical signal;

(d) first means mounted on said support, said first means having an aperture formed therein for threadably engaging said tape means and being movable from its rest position to a tape advance position in response to said magnetic field; and (e) second means mounted on said first means, said second means being movable from its rest position to a tape engaging position in response to the movement of said first means; wherein (f) said tape means are disengaged when said first and second means move to their respective tape advancing and tape engaging positions; and wherein (g) said tape means are releasably engaged when said first and second means return to their respective rest positions; and wherein (h) said second means releases said tape means when said first means reaches its rest position.

References Cited

UNITED STATES PATENTS

| | | | |
|---|---|---|---|
| 421,195 | 2/1890 | Ross | 226—158 |
| 3,140,031 | 7/1964 | Fitch | 226—160 X |

RICHARD A. SCHACHER, Primary Examiner

U.S. Cl. X.R.

226—167